(12) United States Patent
Sa

(10) Patent No.: US 10,630,102 B2
(45) Date of Patent: Apr. 21, 2020

(54) BATTERY DEVICE FOR UNINTERRUPTED POWER SUPPLY AND ELECTRONIC DEVICE WITH SUCH A BATTERY DEVICE

(71) Applicant: Shuang Sa, Richmond (CA)

(72) Inventor: Shuang Sa, Richmond (CA)

( * ) Notice: Subject to any disclaimer, the term of this patent is extended or adjusted under 35 U.S.C. 154(b) by 543 days.

(21) Appl. No.: 13/624,934

(22) Filed: Sep. 23, 2012

(65) Prior Publication Data

US 2013/0076148 A1    Mar. 28, 2013

Related U.S. Application Data

(60) Provisional application No. 61/615,969, filed on Mar. 27, 2012, provisional application No. 61/538,324, filed on Sep. 23, 2011.

(51) Int. Cl.
| | | |
|---|---|---|
| *H02J 1/00* | (2006.01) | |
| *H02J 3/00* | (2006.01) | |
| *H02J 9/06* | (2006.01) | |

(52) U.S. Cl.
CPC ......... *H02J 9/061* (2013.01); *H02J 2009/068* (2013.01); *Y10T 307/696* (2015.04)

(58) Field of Classification Search
CPC .. H02J 9/061; H02J 2009/068; Y10T 307/696
USPC ......... 307/80, 48, 64, 66; 320/107, 111–118, 320/137, 150
See application file for complete search history.

(56) References Cited

U.S. PATENT DOCUMENTS

| | | | | |
|---|---|---|---|---|
| 5,783,964 A | * | 7/1998 | Eitan ..................... | G11C 5/141 327/143 |
| 5,963,010 A | * | 10/1999 | Hayashi ............ | G01R 31/3648 320/106 |
| 6,605,923 B1 | * | 8/2003 | Kellogg ................ | H02J 7/0013 320/110 |
| 6,663,439 B2 | * | 12/2003 | Henry ................ | H01R 13/2421 439/700 |
| 2002/0074970 A1 | * | 6/2002 | Kawashima .......... | H02J 7/0031 320/107 |
| 2004/0176146 A1 | * | 9/2004 | Kim .................. | H04W 52/0296 455/572 |

(Continued)

*Primary Examiner* — Rexford N Barnie
*Assistant Examiner* — Toan T Vu
(74) *Attorney, Agent, or Firm* — Cozen O'Connor

(57) ABSTRACT

The embodiments described herein provide a battery solution for electronic devices that addresses one or more of the above discussed defects. More specifically, a battery device is provided and capable of uninterruptedly supplying power to an electronic device, even when the rechargeable battery in the electronic device is removed. The battery device according to the various embodiments herein can have a host battery and a main battery, each operable to independently supply power to the electronic device in order for the electronic device to carry out its normal operation. When the main battery is removed from the electronic device, the host battery remains in the electronic device and operates to supply power thereto, so that the electronic device can continue its normal manner without interruption, thereby avoiding power shutdown and rebooting operation of the electronic device. When the main battery is connected with the electronic device, the main battery is capable of charging the host battery, while supplying power to the electronic device.

30 Claims, 11 Drawing Sheets

(56) References Cited

U.S. PATENT DOCUMENTS

| | | | | |
|---|---|---|---|---|
| 2005/0162132 A1* | 7/2005 | Nagasawa | ............... | H02J 9/061 320/128 |
| 2009/0027013 A1* | 1/2009 | Odaohhara | ........... | H02J 7/0068 320/160 |
| 2009/0167246 A1* | 7/2009 | Shen | ................... | H01M 10/486 320/128 |
| 2011/0127830 A1* | 6/2011 | Harding | ................ | B60R 16/033 307/10.7 |
| 2011/0305925 A1* | 12/2011 | Ro | ...................... | H01M 10/425 429/7 |
| 2013/0088185 A1* | 4/2013 | Rapoport | .................. | H02J 7/34 320/103 |
| 2013/0300200 A1* | 11/2013 | Wong | ................... | H02J 7/0063 307/48 |

* cited by examiner

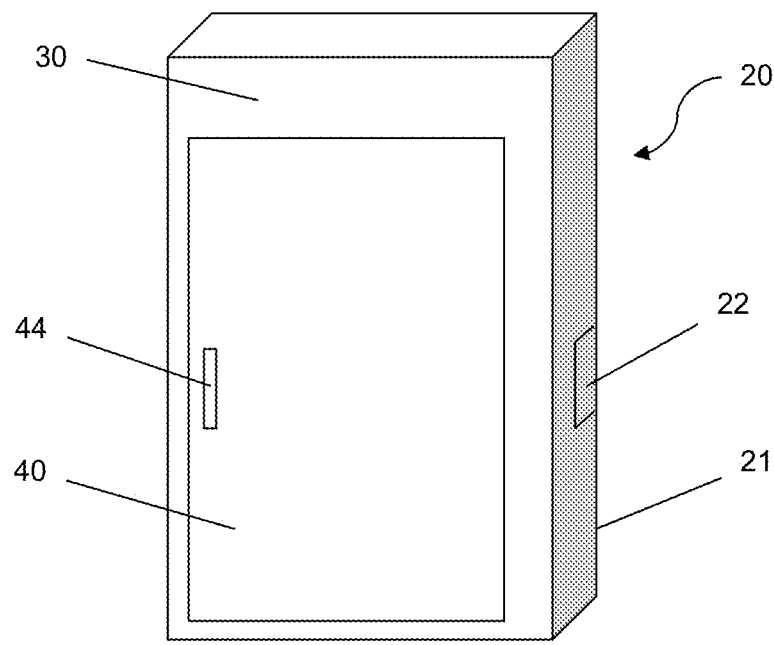
Fig. 3A
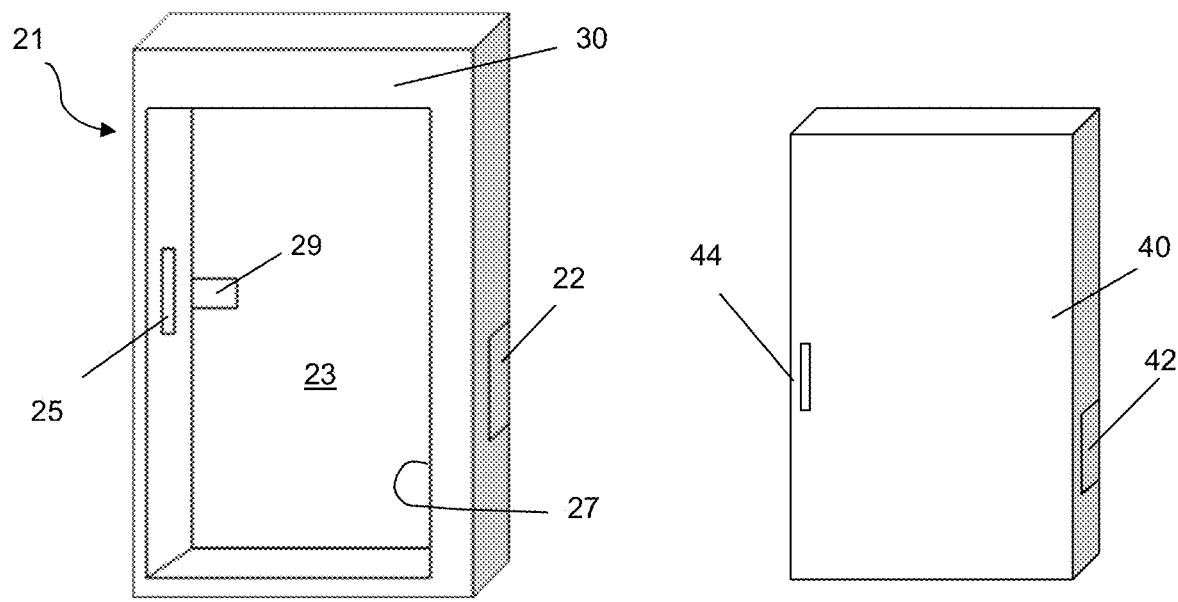
Fig. 3B
Fig. 3C

BATTERY DEVICE FOR UNINTERRUPTED POWER SUPPLY AND ELECTRONIC DEVICE WITH SUCH A BATTERY DEVICE

CROSS-REFERENCE TO RELATED APPLICATIONS

This patent application claims priority from U.S. Provisional Patent Application Nos. 61/538,324 and 61/615,969 filed Sep. 23, 2011 and Mar. 27, 2012, respectively.

FIELD OF THE INVENTION

The invention relates generally to a battery solution for electronic devices, in particular, portable electronic devices. More specifically, the invention relates to a battery device capable of uninterruptedly supplying power to electronic devices. The invention also relates to an electronic device including such a battery device.

BACKGROUND OF THE INVENTION

Rechargeable batteries have been widely used for supplying power to electronic devices, in particular, portable electronic devices. FIG. 1 shows such a conventional rechargeable battery 20', which is typically configured to fit in a battery chamber of an electronic device. The battery 20' is formed with an electrical contact 22' for electrically connecting with an electrical port on the electronic device so that the battery 20' can supply power to the electronic device. The battery 20' can also have additional structures, such as a battery lock and/or a battery chamber door, for retaining the battery 20' in position inside the battery chamber of the electronic device, after the battery 20' is installed inside the battery chamber.

Due to their limited capacity, rechargeable batteries require regular charging to continue power supply to the electronic devices. There are typically two ways of charging a rechargeable battery, one of which is to leave the battery inside the electronic device and connect the electronic device with a battery charger to charge the battery inside the electronic device. As the electronic device is physically attached to and electrically connected with the battery charger when using this charging method to charge the battery, it is awkward or restrictive to use such an electronic device in a normal manner during the battery charging process.

An alternative way of charging a rechargeable battery is to remove the battery from the electronic device and charge the battery separately outside the battery chamber of the electronic device. Typically, a replacement battery can be used in the electronic device to allow the electronic device to continue to operate, while the original battery is being charged. Such battery replacement operation can cause interruption to the power supply to the electronic device. For example, as soon as the original battery is removed from the electronic device, the power supply to the electronic device is discontinued, which is then turned off or shut down, such as by an internal protection circuit. As a result of such battery replacement, the operations carried out by the electronic device are terminated.

The power interruption occurred during the battery replacement interferes with the normal use of the electronic device, such as by interrupting or terminating communication, conversation, and/or data transfer process. For example, when the rechargeable battery is removed from the electronic device while one or more applications are in use, the results of such applications and settings are lost. The user must reset these settings and rerun the applications to obtain the same results, when the electronic device is turned back on after power supply to the electronic device resumes. In other words, conventional rechargeable batteries are unable to carry out hot-swap battery replacement.

SUMMARY OF THE INVENTION

The embodiments described herein provide a battery solution for electronic devices that addresses one or more of the above discussed defects. More specifically, a battery device is provided and capable of uninterruptedly supplying power to an electronic device, even when the rechargeable battery in the electronic device is removed. The battery device according to the various embodiments herein can comprise a host battery and a main battery, each operable to independently supply power to the electronic device in order for the electronic device to carry out its normal operation. When the main battery is removed from the electronic device, the host battery remains in the electronic device and operates to supply power thereto, so that the electronic device can continue its normal manner without interruption, thereby avoiding power shutdown and rebooting operation of the electronic device. When the main battery is connected with the electronic device, the main battery is capable of charging the host battery, while supplying power to the electronic device.

The host battery and the main battery of the battery device can be assembled as one unit and removably installed in an electronic device to supply power thereto. In this case, the battery device can be used with a conventional electronic device, in place of the conventional battery provided to such conventional electronic device. In the alternative, the host battery of the battery device can be built in an electronic device, while the main battery can be removably attached to the electronic device.

The embodiments described herein also provide an electronic device including a battery device described above. The host battery of the battery device can be built in the electronic device as an integrated part, while the main battery is removably connected to the electronic device. For example, the main battery can be removably placed in a battery chamber of the electronic device to supply power to such electronic device to carry out its normal operations.

In one embodiment, a battery device for supplying power to an electronic device is provided. The battery device can comprise a host battery, a main battery, and a battery switch operable to switch between the host battery and the main battery and electrically connect with a selected one of the host battery and the main battery to supply power to the electronic device. The host battery and the main battery are each operable to independently supply power to the electronic device, so that the electronic device can carry out its normal operation. When the main battery is placed in a working position inside the electronic device, the battery switch is operable to electrically connect the main battery with the electronic device to supply power to the electronic device. When the main battery is absent from the electronic device, the battery switch is operable to electrically connect the host battery with the electronic device to supply power thereto.

In one example, the battery switch is operable to disconnect the host battery from supplying power to the electronic device, after the main battery is placed in its working position inside the main device body and operates to supply power to the electronic device.

In another example, after the main battery is placed in its working position inside the main device body, the battery switch is operable to electrically couple the host battery with the main battery, so that the main battery is operable to charge the host battery while the host battery is operable to supply power to the electronic device, after the main battery is placed in a working position inside the main device body.

In a further example, the main battery is operable to power the electronic device and to charge the host battery at the same time, after the main battery is placed in its working position inside the main device body.

The host battery and the main battery have different capacities. In one example, the host battery has less than about 10% capacity of the main battery. In another example, the host battery has about 3-5% capacity of the main battery.

The battery device can further comprise a battery housing configured to attach the host battery and the main battery to the electronic device. In one example, the host battery is enclosed in at least part of the battery housing and inseparable therefrom. In another example, the battery housing is formed with a battery cavity for accommodating and retaining the main battery in place during normal operation of the electronic device. The battery switch can be formed in the battery cavity and is operable by the presence of the main battery. In a further example, the battery housing comprises a first electrical contact for connecting to a device contact on the electronic device and a second electrical contact for connecting with a third electrical contact on the main battery. The first and second electrical contacts on the battery housing can be electrically connected with each other. In one example, at least one of the second and third electrical contacts is a retractable battery contact, wherein the host battery is operable to supply power to the electronic device when the retractable battery contact is at the extended working position, and wherein the main battery is operable to supply power to at least one of the electronic device and the host battery when retractable battery contact is at a retracted working position.

In the battery device, the battery switch can comprise first and second switch contacts formed on the battery housing and the main battery respectively, wherein the host battery is operable to supply power to the electronic device, when the first and second switch contacts are separated from each other, and wherein the main battery is operable to supply power to at least one of the electronic device and the host battery, when the first and second switch contacts electrically contact with each other. The main battery can be operable to supply power to both the electronic device and the host battery when the first and second switch contacts electrically contact with each other. In one example, the battery switch is operable to disconnect the host battery from supplying power to the electronic device when the first and second switch contacts electrically contact with each other. In another example, the battery switch is operable to electrically couple the host battery with the main battery, when the first and second switch contacts electrically contact with each other, so that the main battery is operable to charge the host battery while the host battery is operable to supply power to the electronic device, after the main battery is placed in a working position inside the main device body.

In one example, at least one of the second and third electrical contacts is a retractable battery contact, wherein the retractable battery contacts are at an extended working position, when the first and second switch contacts are separated from each other, and wherein the retractable battery contacts are at a retracted working position when the first and second switch contacts electrically contact with each other.

The battery device can further comprise a charging control circuit electrically coupled between the host battery and the main battery, wherein the main battery is operable to charge the host battery at the same time the main battery operates to supply power to the electronic device. Additionally or alternatively, the battery device can further comprise a switch control circuit, which can be electrically and selectively coupled the host battery and the main battery and operable to cause a time delay in disconnect the host battery from supplying power to the electronic device, after the main battery of the battery device is being installed in the electronic device to supply power thereto.

In another embodiment, a battery device for supplying power to an electronic device is provided and comprises a host battery, a main battery, and a battery switch operable to switch between the host battery and the main battery and electrically connect with a selected one of the host battery and the main battery to supply power to the electronic device, wherein the host battery and the main battery are each operable to independently supply power to the electronic device, so that the electronic device can carry out its normal operation and wherein the main battery is operable to charge the host battery at the same time the main battery operates to supply power to the electronic device. In one example, the main battery comprises multiple battery segments, at least one of which is selected to supply power to the electronic device, when the main battery is installed in the battery device.

The battery device can further comprise an electrical circuit for testing battery capacity and switching battery segments, wherein the testing/switching circuit is electrically coupled to the multiple battery segments to test battery capacity of each of the battery segments and wherein the testing/switching circuit operates to switch to a different battery segment of the main battery, when a low capacity is tested in a battery segment.

In a further embodiment, an electronic device is provided and comprises a main device body, a host battery configured to be attached to the main device body and capable of supplying power to the electronic device, a main battery capable of supplying power to the electronic device, and a battery switch. The main battery is configured to operate the battery switch to switch between the host battery and the main battery and electrically connect a selected one of the host battery and the main battery to the electronic device to supply power thereto. In one example, the main battery is operable to power the electronic device and to charge the host battery at the same time, after the main battery is placed in its working position inside the main device body. In one example, the main battery is directly placed and retained in the battery chamber.

In one example, the main device body is formed with a battery chamber, wherein the host battery is built in the main device body and outside the battery chamber.

In one example, the battery switch is formed in the battery chamber and is operable by the presence of the main battery.

In one example, the battery switch is operable to disconnect the host battery from supplying power to the electronic device and to connect with the main battery to supply power to the electronic device, after the main battery is placed in a working position inside the main device body. Additionally or alternative, the battery switch is operable to electrically couple the host battery with the main battery, so that the main battery is operable to charge the host battery while the host battery is operable to supply power to the electronic device, after the main battery is placed in a working position inside the main device body.

The host battery and the main battery can have different capacities. In one example, the host battery has less than about 10% capacity of the main battery. In another example, the host battery has about 3-5% capacity of the main battery.

BRIEF DESCRIPTION OF THE DRAWINGS

The following description is set forth in connection with the attached drawing figures, which are not necessarily to scale, emphasis instead generally being placed upon illustrating the principles of the invention. In the drawings:

FIG. 3A shows the battery device used in the FIG. 2A electronic device;

FIG. 3B shows a battery housing including the host battery of the battery device of FIG. 3A;

FIG. 3C shows the main battery of the battery device shown in FIG. 3A;

DETAILED DESCRIPTION OF THE EMBODIMENTS

Figure 1:
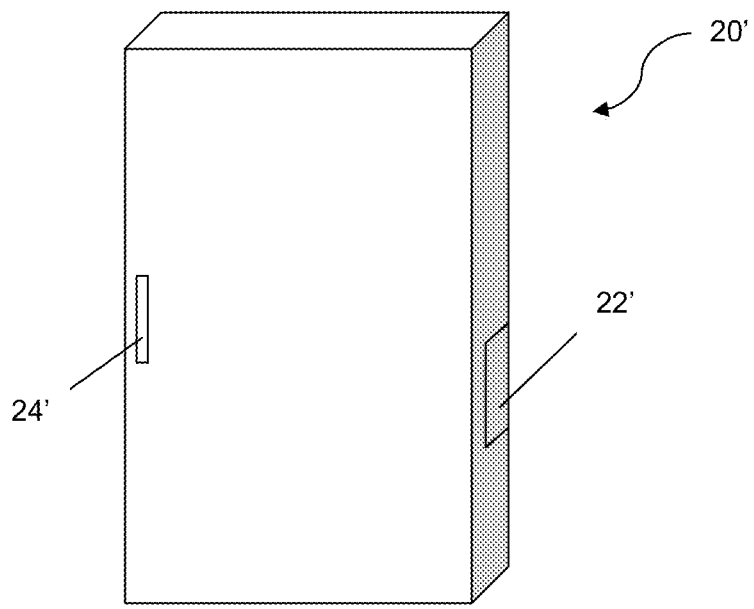
FIG. 1 shows a conventional battery for use in an electronic device.

Various embodiments of the battery device and an electronic device with such a battery device are described below in connection with the drawing figures. In the following description of different embodiments, similar components are designated with the same numeral references and redundant description is omitted.

Figures 2A, 2B:
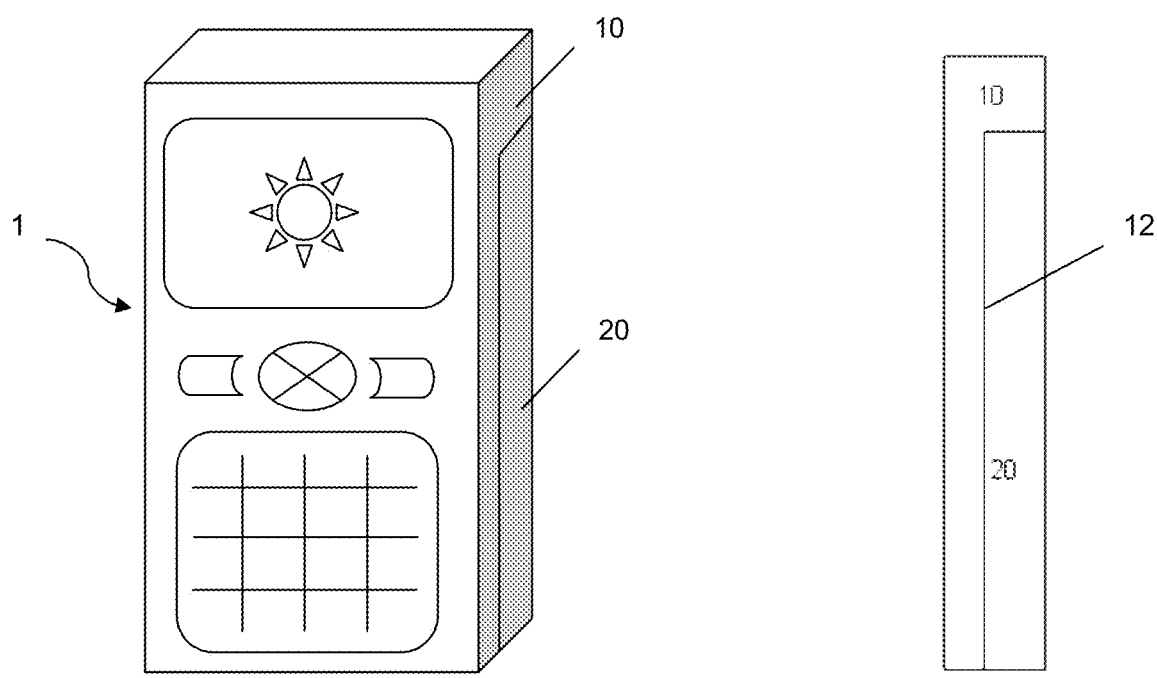
FIG. 2A shows an electronic device including a battery device of a first embodiment.
FIG. 2B is a side view of the electronic device shown in FIG. 2A.

FIGS. 2A and 2B show an electronic device 1, such as a portable electronic device, having a main body 10 in the form of a mobile phone. Although the electronic device 1 is shown in the form of a mobile phone, the various embodiments described herein are not limited to use with such mobile phones but apply to various other electronic devices including, but not limited to, cell phones with or without operating systems, personal data assistants (PDA), mobile computers, tablet computers, notebook computers, netbook computers, unified communication devices, video conference devices, wireless data transceivers, portable video games, MP3 players, digital cameras, video cameras, voice recorders, global positioning systems (GPS), scanners, or other portable electronic device or electronic devices that use rechargeable batteries.

The electronic device 1 also has a battery device 20 operable to supply power to the electronic device 1 to carry out its normal operations, including executing various applications on the electronic device 1 or transferring voice or data over Internet. The battery device 20 is configured to be removably attached to the main body 10 of the electronic device 1. In one example, the battery device 20 can be at least partly accommodated and retained in a battery chamber 12 in the electronic device 1. If desired, a battery cover can be employed to conceal and/or retain the battery device 20 inside the battery chamber 12 of the electronic device 1. The battery device 20 can be connected to the electronic device 1 in various other ways as will be described below.

The battery device 20 according to the various embodiments herein can comprise a host battery 30 and a main battery 40. The host battery 30 and the main battery 40 of the battery device 20 are configured to be separable from each other and be attached to the main body 10 of the electronic device 1. Each of the host battery 30 and the main battery 40 of the battery device 20 is operable to independently supply power to the electronic device 1 to carry out its normal operation. For example, the host battery 30 and the main battery 40 of the battery device 20 are each independently and electrically connected to a battery contact 22 formed on the battery device 20. When the battery device 20 is attached to the electronic device 1, the battery contact 22 is electrically connected to a device contact (not shown) formed on the electronic device 1, so that one of the host battery 30 and the main battery 40 can supply power to the electronic device 1 to carry out its normal operation.

According to one aspect of the various embodiments herein, the host battery 30 of the battery device 20 can operate to supply power to the electronic device 1 to fully carry out its normal operation, in the absence of the main battery 40 of the battery device 20. In one example, when the main battery 40 can be detached and separated from the electronic device 1 during the normal operation of the battery device 20, the host battery 30 remains in the electronic device 1 and operates to supply power to the electronic device 1 to continue its normal operation. For example, the host battery 30 can maintain the results of all the applications operating on the electronic device 1. In one example, the host battery 30 does not output power to the electronic device 1 until the main battery 40 is removed from the electronic device 1. The battery device 20 described herein thus allows the electronic device 1 to continue its normal operation, after the main battery 40 is detached and removed from the electronic device 1.

In one example, a replacement battery, similar to the main battery 40, can be used to supply power to the electronic device 1, after the main battery 40 of the battery device 20 is removed from the electronic device 1. In such a case, the host battery 30 of the battery device 20 can be configured to maintain the normal operation of the electronic device 1, without the main battery 40, for a sufficient period of time until a replacement battery is placed in the electronic device 1 to supply power thereto. The host battery 30 so formed allows for uninterrupted power supply to the electronic device 1, at least during the replacement of the main battery 40, and avoids interruption to the normal operation of the electronic device 1. In other words, the battery solution provided therein affords continuous and uninterrupted power supply to the electronic device 1, during the battery replacement process to remove the main battery 40 from the electronic device 1 and install a properly charged replacement battery. As such, a "hot-swap" of battery is made possible during the normal operation of the various electronic devices 1.

In another example, the detached main battery 40 can be subjected to a battery charging operation. For example, the detached main battery 40 can be used with a charging device so as to recharge the detached main battery 40. Once charging operation is completed, the recharged main battery 40 can be again used with the electronic device 1 to continuously supply power thereto. For example, the replacement battery can removed from the electronic device 1 so that the main battery 40 can be reconnected with the electronic device 1 to supply power thereto. During such a battery replacement process, the host battery 30 of the battery device 20 operates to maintain the normal operation of the electronic device 1 and avoids interruption thereof caused by the battery replacement operation. The alternation between the main battery 40 and the replacement battery, together with the external battery charging operation, allows for an extended continuous power supply to the electronic device 1.

According to another aspect of the various embodiments here, the main battery 40 of the battery device 20 can operate to supply power to the electronic device 1, when the main battery 40 is used together with the host battery 30. In one embodiment, the main battery 40 of the battery device 20 is formed as the primary power source for the electronic device 1. The main battery 40 can be configured to in various forms to facilitate simple and easy attachment to and removal from the electronic device 1.

The main battery 40, when used to power the electronic device 1, can operate to disconnect the host battery 30 from the power supplying circuit so that the host battery 30 ceases to supply power to the electronic device 1. For example, a battery switch 29 can be electrically connected with and operable to switch on/off the host battery 30. The battery switch 29 can be operated either manually by the user, or triggered by the presence of the main battery 40. In one example, the battery switch 29 can be a mechanically operated switch, which can be switched on/or when the main battery 40 is placed in or removed from the electronic device 1. When the main battery 40 is attached to the electronic device 1 to supply power thereto, the main battery 40 can switch off and disconnect the host battery 30 from the power supply circuit. In one example, the disconnection of the host battery 30 can be delayed to ensure that the main battery 40 of the battery device 20 is properly installed in the electronic device 1 to supply power thereto. In another example as will be described below, a switch control circuit 29' can be provided, instead of a battery switch 29 discussed above, and operates to select one of the host and main batteries 30, 40 to supply power to the electronic device 1 to carry out its normal operation.

Additionally or alternatively, the battery device 20 is configured so that the main battery 40 is capable of charging the host battery 30, when the main battery 40 is attached to the electronic device 1 and operates to supply power thereto. In one example, the main battery 40 is operable to supply power to the electronic device 1 directly, bypassing the host battery 30 as will be described in the embodiments below. In another example, the main battery 40 is operable to supply power to the electronic device 1 through the host battery 30, as will be described in the embodiments below. As will be described in further details below, the main battery 40 can recharge the host battery 30 after each use thereof, to allow the host battery 30 to independently supply power to the electronic device 1 during the next battery replacement operation. As such, both the host battery 30 and the main battery 40 of the battery device 20 can be recharged to provide continuous, uninterrupted power supply to the electronic device 1 to carry out its normal operation.

The host battery 30 and the main battery 40 have different capacities. In one example, the host battery 30 can have less than about 10% capacity of the main battery 40. In another example, the host battery 30 can have about 3-5% capacity of the main battery 40.

The battery device 20, as well as its various components, will be further described in great detail in connection with the various embodiments below, together with the drawing figures accompanied herewith.

Figure 3D:
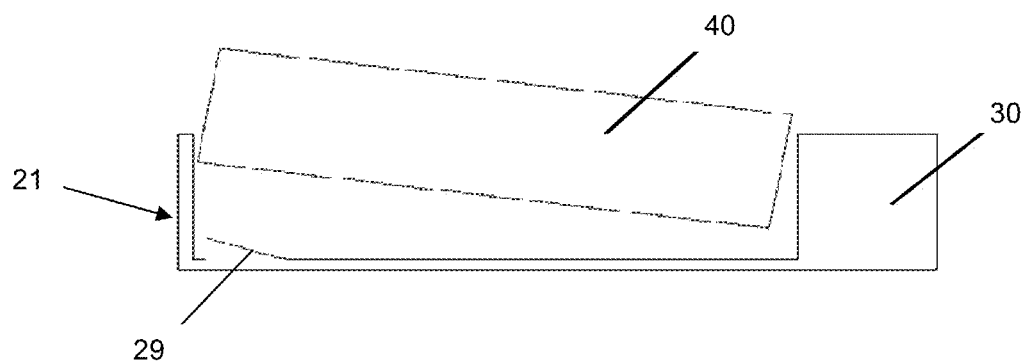
FIG. 3D shows the main battery being installed in the battery housing.

FIGS. 3A to 3D illustrate a first embodiment of the battery device 20, in which the host battery 30 and the main battery 40 form a battery pack as is best shown in FIG. 3A. The battery device 20 has a battery contact 22 formed to be electrically connected with a device contact on the main body 10 of the electronic device 1. In the examples shown in FIGS. 3A to 3D, the battery device 20 can comprise a battery housing 21, which is configured to attach the host battery 30 and the main battery 40 to the main body 10 of the electronic device 1. The battery contact 22 can be formed on the battery housing 21 for electrically connecting with a device contact on the main body 10 of the electronic device 1, when the battery device 20 is attached to the electronic device 1. The battery contact 22 can selectively connect the host battery 30 and the main battery 40 with the electronic device 1, in order to supply power thereto.

The battery housing 21 can be formed in various manners to mount the host battery 30 and the main battery 40 to the main body 10 of the electronic device 1. In one example, the battery housing 21 can be formed to encase the host battery 30 therein. Such battery housing 21 can be formed as an extension of the host battery 30. In an alternative example, the host battery 30 can be removable and/or detachable from the battery housing 21. The host battery 30 mounted in the battery housing 21 is electrically connected to the battery contact 22 on the battery housing 21, so that the host battery 30 can be electrically connected with a device contact on the electric device 1 to supply power thereto for the electronic device 1 to carry out its normal operation.

In one example best shown in FIG. 3B, the battery housing 21 can be formed with a battery cavity 23, in which the main battery 40 can be contained and supported. Typically, the battery cavity 23 can be formed to have a shape and size substantially the same as that of the main battery 40, so that the main battery 40 can be properly retained inside the battery cavity 23 during the normal operation of the electronic device 1. Various retaining structures 25 can be provided in the battery cavity 23 and/or the battery housing 21 to assist in retaining the main battery 40 in position during the normal operation of the battery device 20. In one example, a retraining structure 25 is formed on the sidewall of the battery cavity 23 for engaging with a complementary retraining structure on the main battery 40 of the battery device 20.

The battery housing 21 is formed with an internal electrical contact 27, which is electrically connected with the battery contact 22 on the battery housing 21. The internal electrical contact 27 can also be electrically connected with a battery contact 42 on the main battery 40, so that the main battery 40 can be electrically connected to the electronic device 1 to supply power thereto. More specifically, the internal electrical contact 27 is so positioned on the battery housing 21 that, after the main battery 40 is installed in the battery housing 21, the internal electrical contact 27 can electrically connect with the battery contact 42 on the main battery 40. In the example of FIG. 3B, the internal electrical contact 27 is formed on a sidewall of the battery cavity 23. When the main battery 40 is placed in the battery cavity 23, the battery contact 42 on the main battery 40 can electrically connect with the internal contact 27 on the sidewall of the battery cavity 23, so that the main battery 40 can supply power to the electronic device 1 to carry out its normal operation.

The main battery 40 of the battery device 20 can be formed to be removably attached to the battery housing 21. In the example shown in FIG. 3C, the main battery 40 is shaped and sized to fit inside the battery cavity 23 in the battery housing 21. Additional retaining structures can be formed on the main battery 40 to cooperate with the complementary retaining structures 25 on the battery housing 21 to assist in retaining the main battery 40 inside the battery cavity 23 of the battery housing 21. The main battery 40 of the battery device 20 is formed with a battery contact 42 for electrically connecting with the internal contact 27 formed on the battery housing 21.

Figure 4A:
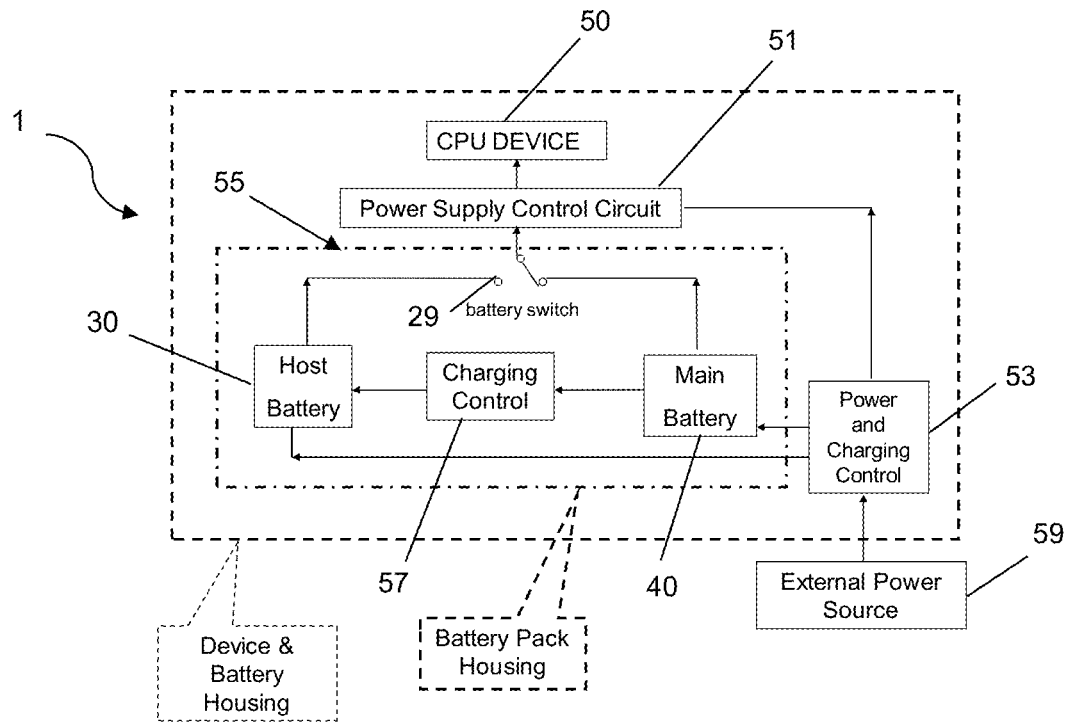
FIG. 4A is a block diagram of an electronic device including a battery device formed according to the first embodiment.

As FIGS. 3B and 3D show, the battery housing 21 is formed with a battery switch 29, which can be operated through the insertion of the main battery 40 as is shown in FIG. 3D. In one example, the battery switch 29 can be electrically connected and operable to switch between the host battery 30 and the main battery 40 of the battery device 20, as is illustrated in FIG. 4A. The battery switch 29 can be operated either manually by the user, or triggered by the presence of the main battery 40 of the battery device 20.

In one example, the battery switch 29 can be a mechanically operated switch, which can be switched on/off when the main battery 40 is placed in or removed from the electronic device 1. In the example of FIG. 3D, the battery switch 29 is in an "OFF" position before the main battery 40 is placed inside the battery cavity 23 in the battery housing 21. When the battery switch 29 is at such "OFF" position, the power supply circuit containing the main battery 40 is switched off, while the power supply circuit containing the host battery 30 is switched on. In other words, when the battery switch 29 is at such "OFF" position, the host battery 30 of the battery device 20 operates to supply power to the electronic device 1.

When the main battery 40 is properly placed in the battery housing 21 and used together with the host battery 30, as is shown in FIG. 3A, the main battery 40 actuates the battery switch 29 and switches it to an "ON" position. When the battery switch 29 is at such "ON" position, the battery switch 29 can connect the power supply circuit of the main battery 40 and disconnect the power supply circuit of the host battery 30, as is shown in FIG. 4A. At such time, the main battery 40 of the battery device 20 operates to supply power to the electronic device 1, while the host battery 30 is switched off and ceases to supply power to the electronic device 1.

In one embodiment, a time delay mechanism is provided so that the disconnection of the host battery 30 can be delayed, so that the main battery 40 of the battery device 20 is properly installed in the electronic device 1 to supply power thereto, before the host battery 30 ceases to supply power to the electronic device 1. In the example shown in FIG. 3B, the battery switch 29 is formed at a location away from the internal contact 27. For example, the internal contact 27 and the battery switch 29 are formed on opposite sidewalls of the battery housing 21. When installing a main battery 40 of the battery device 20, the battery contact 42 of the main battery 40 can be made to contact the internal contact 27, before the battery switch 29 is switched to an "ON" position to turn off the host battery 30 of the battery device 20. As such, the host battery 30 can be disconnected after the main battery 40 starts to supply power to the electronic device 1 to ensure continuous and uninterrupted power supply to the electronic device 1. Other types of time delay mechanism can also be employed to achieve the same purpose, as will be described in the embodiments below.

Figure 3E:
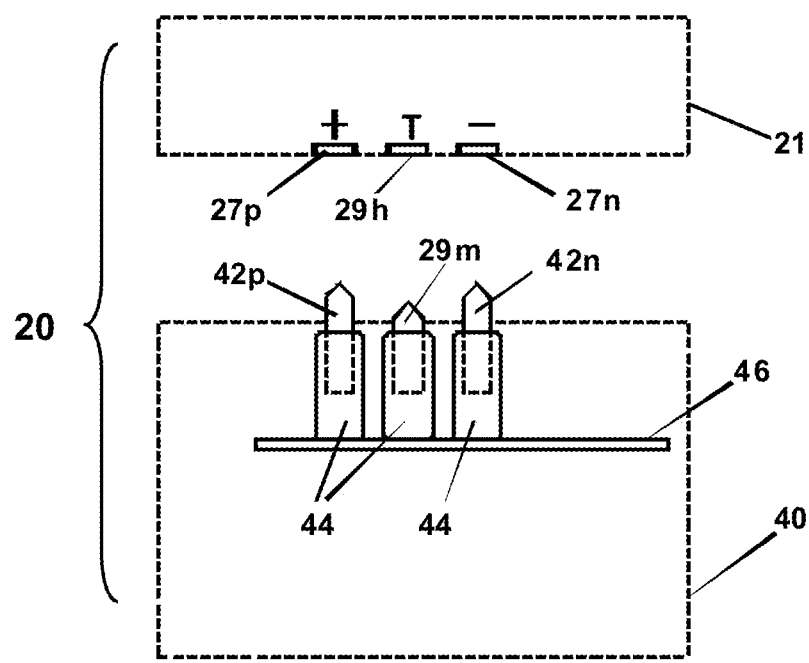
FIG. 3E shows an example of battery contacts formed on the host and main batteries.
Figure 3F:
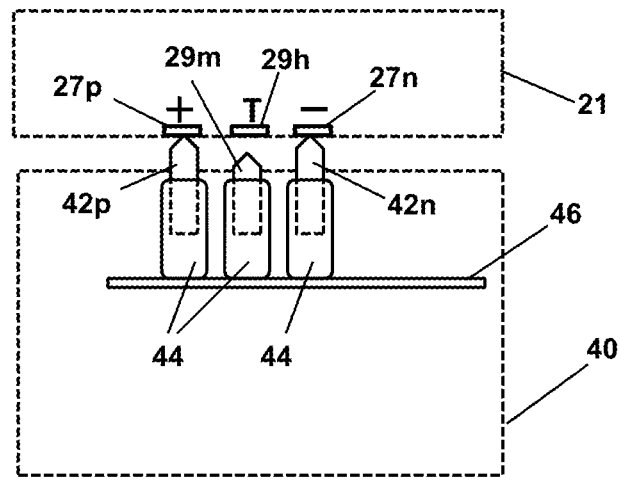
FIG. 3F shows a first contact position of the battery contacts shown in FIG. 3E.
Figure 3G:
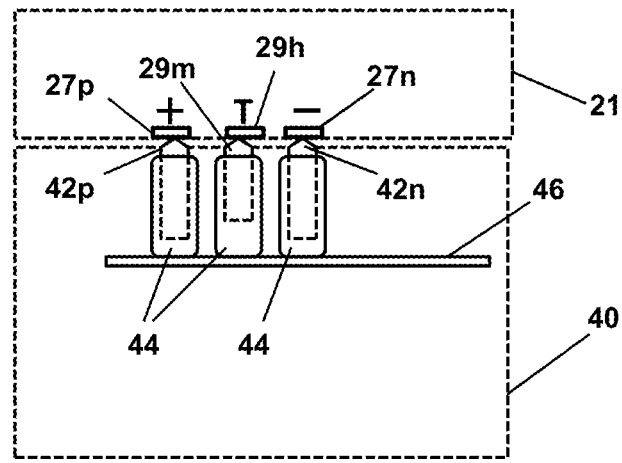
FIG. 3G shows a second contact position of the battery contacts shown in FIG. 3E.

In another example shown in FIGS. 3E-3G, the battery housing 21 can be formed with internal contacts 27p, 27n, which are configured to electrically contact the corresponding battery contacts 42p, 42n formed on the main battery 40 to allow the main battery 40 to supply power to the electronic device 1. For example, when the internal contacts 27p, 27n on the battery housing 21 electrically contact the battery contacts 42p, 42n on the main battery 40, the main battery 40 is connected in the power supply circuit to supply power to the electronic device 1. At this time, the host battery 30 can receive power supply from the main battery 40, or supply power to the electronic device 1 together with the main battery 40, or be disconnected from the power supply circuit as will be further described below.

The battery housing 21 is formed with a switch contact 29h, which is configured to contact a corresponding switch contact 29m formed on the main battery 40 to disconnect the host battery 30 from the power supply circuit. The switch contacts 29h, 29m form and work as a battery switch as is described below. In an example best shown in FIG. 3E, the switch contact 29m on the main battery 40 extends from the main battery 40 to a less extent than the battery contacts 42p, 42n. When the main battery 40 is first placed in the battery device 20 so that the battery contacts 42p, 42n on the main battery 40 just electrically contact the internal contacts 27p, 27n on the battery housing 21, as is shown in FIG. 3F, the switch contacts 29h, 29m are spaced away from each other. As such, the switch contacts 29h, 29m are not in electrical contact with each other to disconnect the host battery 30 from the power supply circuit. As a result, the disconnection of the host battery 30 does not occur at the same time when the main battery 40 is activated to supply power to the electronic device 1.

As is shown in FIGS. 3E-3G, the battery contacts 42p, 42n on the main battery 40 are formed to be retractable between an extended position shown in FIG. 3E or 3F and a retracted position shown in FIG. 3G. When the main battery 40 is in position in the battery device 20 as is shown in FIG. 3G, the battery contacts 42p, 42n on the main battery 40 remain in electrical contact with the internal contacts 27p, 27n on the battery housing 21, but are retracted or otherwise deformed to allow the switch contacts 29h, 29m to contact each other. When the switch contacts 29h, 29m are in contact with each other, the host battery 30 is disconnected from the power supply circuit so that the main battery 40 becomes the only power source to the electronic device 1.

When the main battery 40 is to be removed from the battery device 20, the switch contacts 29h, 29m are separated first, while the internal contacts 27p, 27n on the battery housing 21 remain in electrical contact with the battery contacts 42p, 42n on the main battery 40, as is shown in FIG. 3F. The separation of the switch contacts 29h, 29m activates the host battery 30 so that the host battery 30 can operate to supply power to the electronic device 1 while the main battery 40 continues to supply power to the electronic device 1. As such, the host battery 30 kicks in before the main battery 40 is disconnected or otherwise removed from the battery device 20 to thereby ensure continuing power supply to the electronic device 1. When the main battery 40 is separated and removed from the battery device 20 and the electronic device 1, the host battery 30 maintains the power supply to the electronic device 1 before another main battery 40 is placed in the battery device 20 to supply power to the electronic device 1.

Figure 3H:
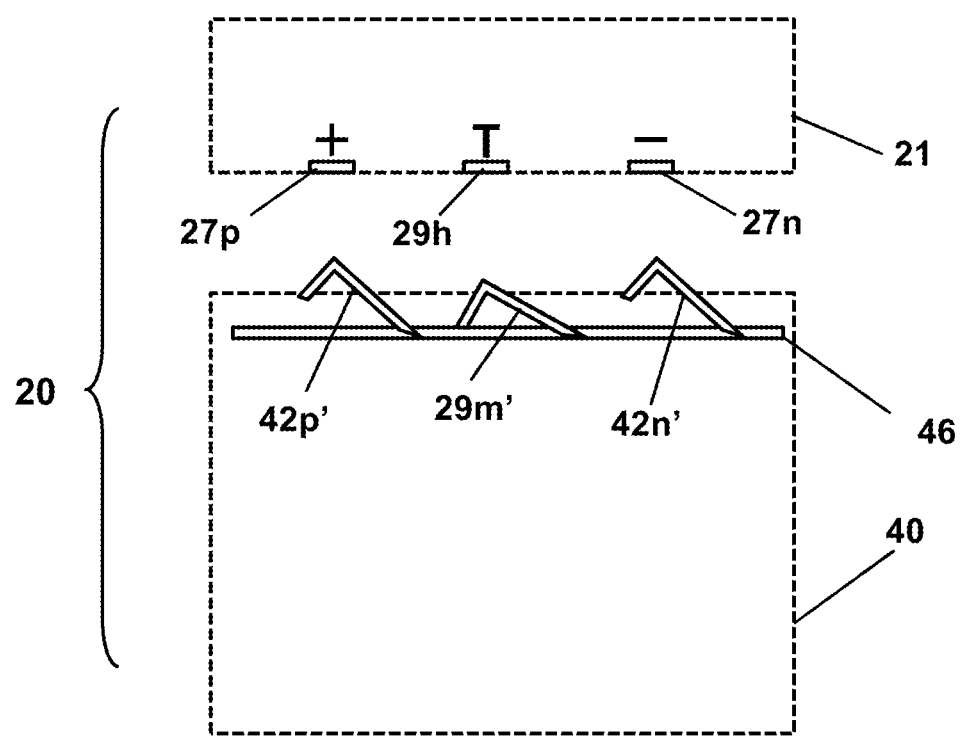
FIG. 3H shows another example of battery contacts formed on the host and main batteries.
Figure 3I:
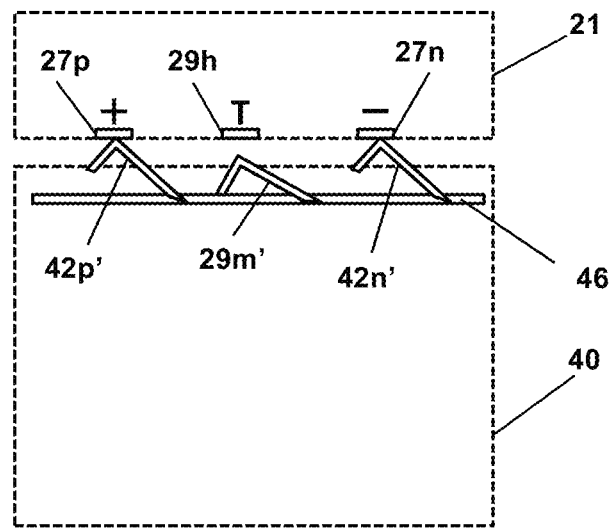
FIG. 3I shows a first contact position of the battery contacts shown in FIG. 3H.
Figure 3J:
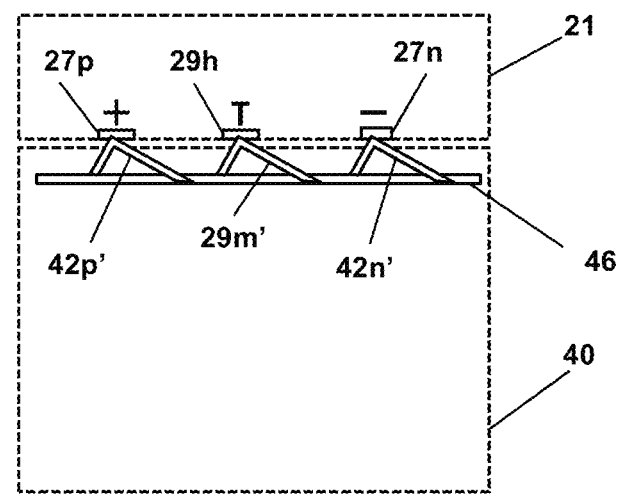
FIG. 3J shows a second contact position of the battery contacts shown in FIG. 3H.

The battery contacts 42p, 42n can be formed in various manners to achieve the above described purpose. In an example shown in FIGS. 3E-3G, the battery contacts 42p, 42n can be retractably held in their respective contact holders 44. For example, a spring component (not shown) can be used to support the battery contacts 42p, 42n in their respective contact holders 44. If desired, the switch contact 29m on the main battery 40 can also have a retractable configuration to provide a better contact between the switch contacts 29h, 29m. In a variation shown in FIGS. 3H-3J, the battery contacts 42p', 42n' of the main battery 40 can be in the form of springs. If desired, the switch contact 29m' on the main battery 40 can also have a retractable configuration to provide a better contact between the switch contacts 29h', 29m'.

Although the drawing figures show that the retractable configuration is implemented through the battery contacts 42p, 42n, 42p', 42n', one skilled in the art will appreciate that the internal contacts 27p, 27n on the battery housing 21 can be similarly formed to have a retractable configuration.

Additionally or alternatively, the power supply circuit of the battery device 20 is configured so that the main battery 40 can operate to charge the host battery 30, when the main battery 40 is properly placed in the battery housing 21. For example, the host battery 30 and the main battery 40 can be electrically connected to each other to form a charging control circuit. When the main battery 40 is attached in the battery device 20 and thus connected in the charging control circuit, the main battery 40 can operate to charge the host battery 30, while supplying power to the electronic device 1. As will be described in the embodiments below, the main battery 40 is operable to supply power to the electronic device 1 either directly, bypassing the host battery 30, or through the host battery 30.

The battery device 20 can be attached to the main body 10 of the electronic device 1 in various manners. In one example, the battery housing 21 can be configured to have a shape and size to properly fit inside the battery chamber 12 of the electronic device 1. For example, the battery housing 21 can have the same size and shape as those of a conventional battery used to power the electronic device 1. The battery device 20 so formed can have a similar external profile to that a conventional battery pack and can thus be attached to the main body 10 of the electronic device 1 in a similar way that a conventional battery pack is attached to an electronic device 1. As such, the battery device 20 can be used in place of the conventional device battery and be used with an electronic device 1 without altering the electronic device 1.

Various locking mechanism can be employed to lock the battery housing 21 and/or the battery device 20 inside the battery chamber 12 in the main body 10 of the electronic device 1. In one example, the lock mechanism can be similarly formed to those used to secure a conventional battery in the battery chamber 12 of the electronic device 1. In another example, the battery housing 21 can be formed to be fixed to or otherwise as a part of the housing of the electronic device 1. In both of the above examples, the host battery 30 and/or the main battery 40 of the battery device 20 can be configured to be removably attached to the battery housing 21.

FIG. 4A is a block diagram of an electronic device 1 including a battery device 20 formed according to the first embodiment. In an example shown in FIG. 4A, the electronic device 1 can include a CPU device 50, a power supply control circuit 51, a power and charging control circuit 53, and a battery pack circuit 55. The power supply control circuit 51 is electrically coupled to the CPU device 50 for controlling a power supply operation to the CPU device 50. The power and charging control circuit 53 is electrically coupled to the host battery 30, the main battery 40, and the power supply control circuit 51 for controlling the battery charging operation from an external power source 59 to the host battery 30, the main battery 40, and/or the CPU device 50. In one example, an A/C adapter can be employed and electrically connected between the external power source 59 and the power and charging control circuit 53.

The battery pack circuit 55 is electrically coupled to the power supply control circuit 51 to supply power to the CPU device 50. In one example shown in FIG. 4A, the battery pack circuit 55 is electrically coupled to the power supply control circuit 51 through a battery switch 29, so that one of the host battery 30 and the main battery 40 operates to supply power to the CPU device 50. When the main battery 40 is absent from the electronic device 1, the battery switch 29 operates to disconnect the main battery 40 from the battery charging circuit 57 and connect with the host battery 30 of the battery device 20. In such a case, the host battery 30 operates to supply power to the electronic device 1. When the main battery 40 is in a working position inside the battery device 20, the battery switch 29 can operate to connect with the main battery 40, as is shown in FIG. 4A, so that the main battery 40 operates to supply power to the electronic device 1. In one example, the battery switch 29 can operate to disconnect the host battery 30 from the battery charging control circuit 57 and connect with the main battery 40, as can be understood from the depiction of FIG. 4A. As FIG. 4A shows, the main battery 40 can operate to charge the host battery 30, while supplying power to the electronic device 1.

Figure 4B:
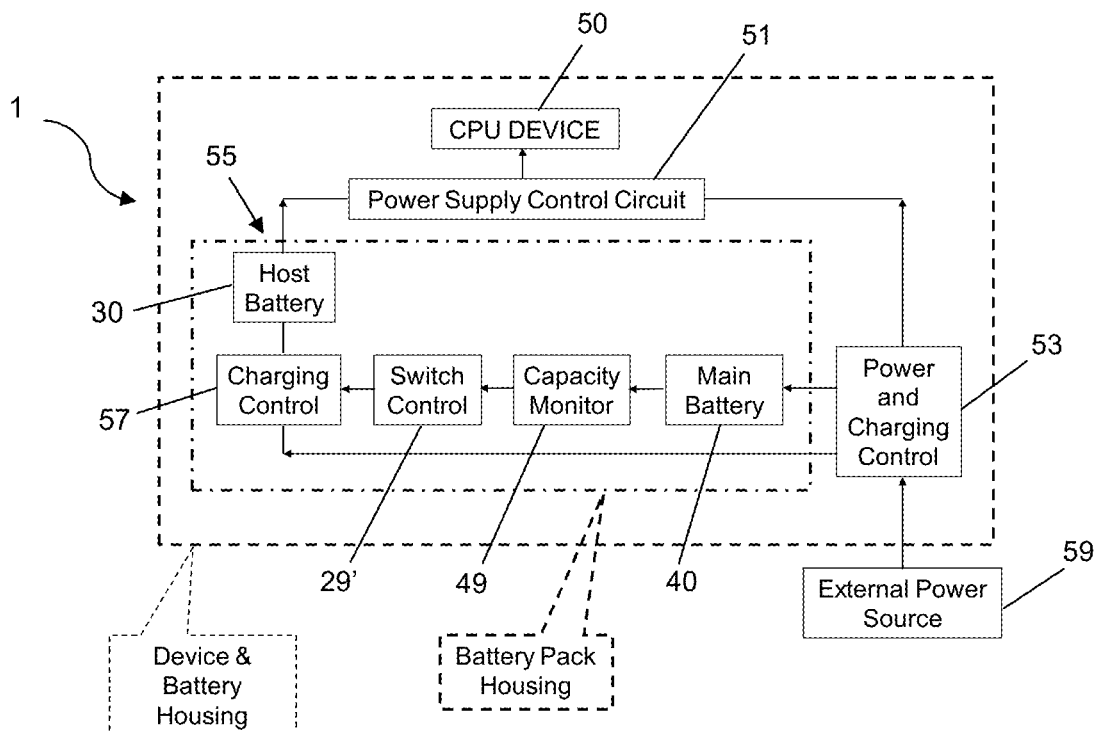
FIG. 4B is a block diagram of an electronic device including a battery device formed as a variation of the first embodiment.

In an alternative example shown in FIG. 4B, the host battery 30 of the battery device 20 remains being electrically coupled to the power supply control circuit 51 and is operable to supply power to the electronic device 1. In this example, a switch control circuit 29' is employed, instead of a battery switch 29 discussed above, and electrically coupled between the host battery 30 and the main battery 40. When the main battery 40 is absent from the battery device 20, the switch control circuit 29' is switched off, so that the host battery 30 operates to supply power to the electronic device 1.

When the main battery 40 is in its working position in the battery device 20, the switch control circuit 29' is switched on to electrically couple the main battery 40 with the host battery 30, so that the main battery 40 can operate to supply power to the electronic device 1 through the connection between the host battery 30 and the power supply control circuit 51. In one example as shown in FIG. 4B, a capacity monitor circuit 49 can be employed to facilitate the operation of the main battery 40. For example, the capacity monitor circuit 49 can monitor the capacity of the main battery 40. When the main battery 40 has a higher capacity than a predetermined reference value, the capacity monitor circuit 49 can generate a switch-on signal to operate the switch control circuit 57 to electrically connect the main battery 40. As such, the main battery 40 is switched on to supply power to the electronic device 1. When the main battery 40 runs out of power or has lower capacity than the predetermined reference value, the capacity monitor circuit 49 can generate a switch-off signal to operate the switch control circuit 57 to disconnect the main battery 40. The capacity monitor circuit 49 can also generate a warning signal notify the user of the electronic device 1 that the main battery 40 needs to be replaced. When the main battery 40 is removed and being replaced, the host battery 30 can operate to supply power to the electronic device 1, as is described above.

Additionally or alternatively, the main battery 40 can charge the host battery 30, when the main battery 40 supplies power to the electronic device 1 through the connection between the host battery 30 and the battery switch 29. As is shown in FIG. 4B, a charging circuit 57 can be used to facilitate the charging operation to the host battery 30 as will be described in great details below.

The battery pack circuit 55 can be configured to include a charging control circuit 57 for controlling the recharging operation of the host battery 30 by the main battery 40. In one example, the charging control circuit 57 can be configured to electrically couple the host battery 30 with the main battery 40, after the main battery 40 is used in the battery device 20. When the main battery 40 of the battery device 20 is placed in the electronic device 1, the main battery 40 is electrically coupled to the charging control circuit 57 and thus capable of recharging the host battery 30 through the operation of the charging control circuit 57. For example, the charging control circuit 57 can operate to increase the output voltage from the main battery 40 in order to charge the host battery 30. The charging control circuit 57 can also monitor the temperature of the host battery 30 during its charging operation.

The use and operation of the battery device 20 will be described as follows.

The battery device 20 can be first attached to the main body 10 of the electronic device 1 by various means. For example, the battery housing 21 can be fit inside the battery chamber 12 of the electronic device 1. The main battery 40 of the battery device 20 can be inserted in the battery cavity 23 formed in the battery housing 21, to supply power to the electronic device 1. In addition, the battery device 20 can be electrically connected with the electronic device 1 to supply power thereto in order for the electronic device 1 to carry out its normal operation. For example, the battery device 20 can be formed with a battery contact 22 for electrically connecting with a device contact provided on the electric device 1. In the example of FIG. 3B, the battery contact 22 is formed on a sidewall of the battery housing 21.

During the normal operation of the battery device 20, the main battery 40 is used together with the host battery 30. For example, the main battery 40 can be inserted in the battery cavity 23 in the battery housing 21, which in turn is inserted in the battery chamber 12 formed in the main body 10 of the electronic device 1, as is shown in FIGS. 2A and 2B. After the battery device 20, including the main battery 40, is properly installed, the main battery 40 of the battery device 20 can operate to supply power to the electronic device 1 to allow the electronic device 1 to carry out its normal operation.

In one embodiment, the main battery 40 of the battery device 20 can act to switch off the charging circuit of the host battery 30. In other words, the main battery 40 of the battery device 20 operates to supply power directly to the electronic device 1 during the normal power supply operation of the battery device 20. In another embodiment, the main battery 40 of the battery device 20 can operate to switch off the power supply circuit of the host battery 30, so that the host battery 30 ceases to supply power to the electronic device 1. In a further embodiment, the main battery 40 can operate to supply power to the electronic device 1 through the host battery 30. The main battery 40 can operate to charge the host battery 30, when the main battery 40 operates to supply power to the electronic device 1.

When the main battery 40 is removed from the electronic device 1, the host battery 30 is switched on and used to supply power to the electronic device 1, so that the electronic device 1 can continue to carry out its normal operation without power interruption. During the operation of the host battery 30, a replacement battery, similar to the main battery 40, can be used in the electronic device 1 to supply power thereto. The removed main battery 40 can be subjected to a battery charging operation using an external battery charging device. After the main battery 40 is recharged, the main battery 40 can be again used with the electronic device 1 to supply power thereto. The replacement battery is removed from the electronic device 1 and subjected to a battery charging operation, if needed. During such battery replacement operation, the host battery 30 of the battery device 20 is switched on and operates to supply power to the electronic device 1 so that the electronic device 1 can continue its normal operation without any power interruption.

Figure 5A:
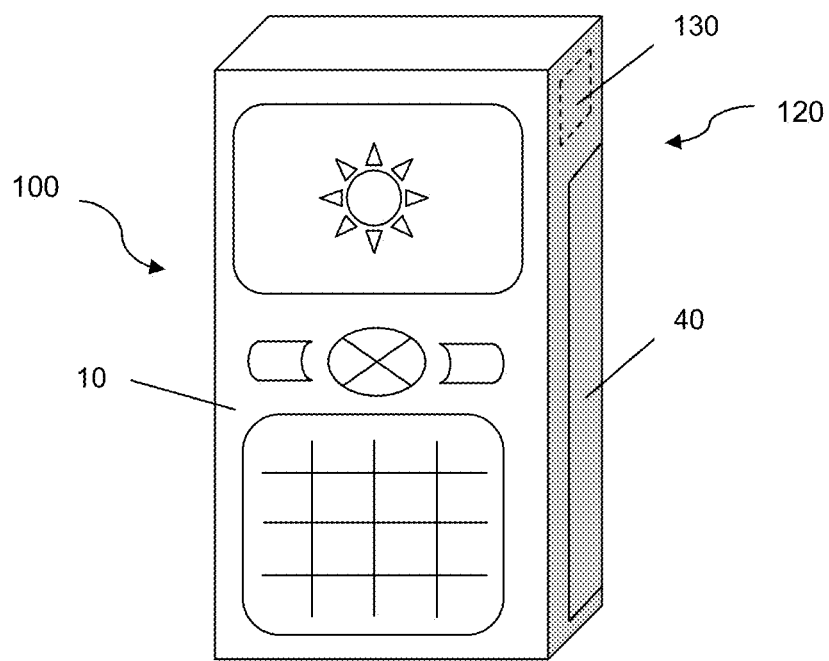
FIG. 5A shows an electronic device including a battery device of a second embodiment.
Figure 5B:
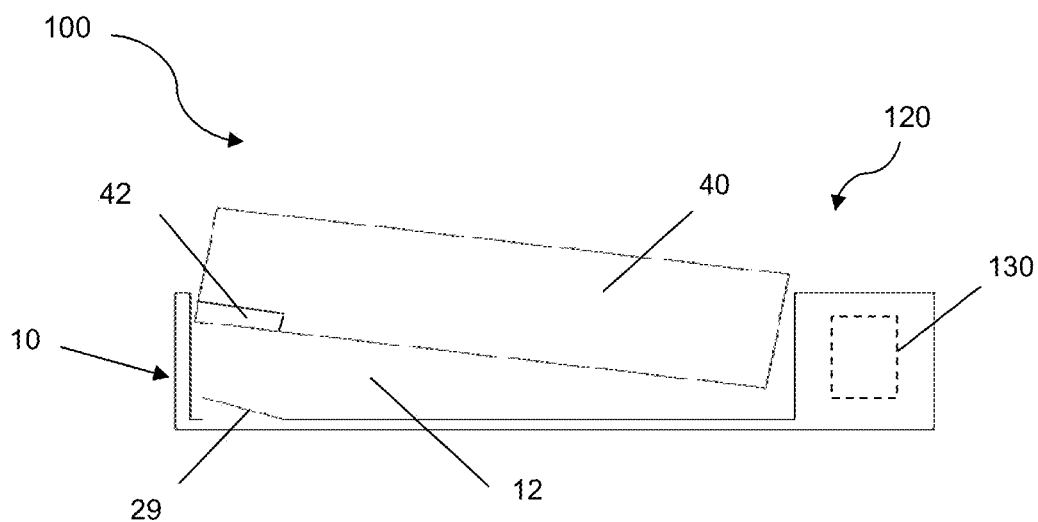
FIG. 5B shows the main battery being installed in the battery device shown in FIG. 5A.

FIGS. 5A and 5B show an electronic device 100 including a battery device 120 formed according to a second embodiment. The battery device 120 includes a host battery 130, which is built in the main body 10 of the electronic device 100. In one example, the host battery 130 of the battery device 120 can be configured to be removably attached to the main body 10 of the electronic device 100. In this embodiment, the host battery 130 is configured to supply power directly to the electronic device 100 to carry out its normal operation. In the example shown in FIG. 7, the host battery 130 of the battery device 120 can be electrically connected to and supply power to the CPU of the electronic device 100. There is no need for a separate battery housing, such as the battery housing 21 described above in the first embodiment, to attach the host battery 130 to the main body 10 of the electronic device 100.

The battery device 120 according to the second embodiment also has a main battery 40 formed to be removably attached to the main body 10 of the electronic device 100 to supply power thereto. For example, the main battery 40 can be directly placed and retained in the battery chamber 12 formed in the main body 10 of the electronic device 100. In such a case, no battery housing is necessary to attach the main battery 40 to the main body 10 of the electronic device 100. The main battery 40 is formed with a battery contact 42 for electrically connecting with the device contact formed on the main body 10 of the electronic device 100, so that the main battery 40 can operate to supply power to the electronic device 100. In one example, the main battery 40 of the battery device 120 can be shaped and sized similarly to a conventional battery.

In addition, the electronic device 100 in the second embodiment is formed with a battery switch 29. In one example, the battery switch 29 is formed on sidewall in the battery chamber 12 of the main body 10 of the electronic device 100. In one embodiment, the battery switch 29 can be formed as part of the device contact for electrically connecting with the battery contact 42 formed on the main battery 40 of the battery device 120. When the main battery 40 is placed in the battery chamber 12 of the electronic device 100, the main battery 40 can actuate the battery switch 29 to disconnect the power supply circuit of the host battery 130 and to connect the power supply circuit of the main battery 40. As such, the main battery 40 can substitute the host battery 130 to supply power to the electronic device 100 to carry out its normal operation.

Figure 6A:
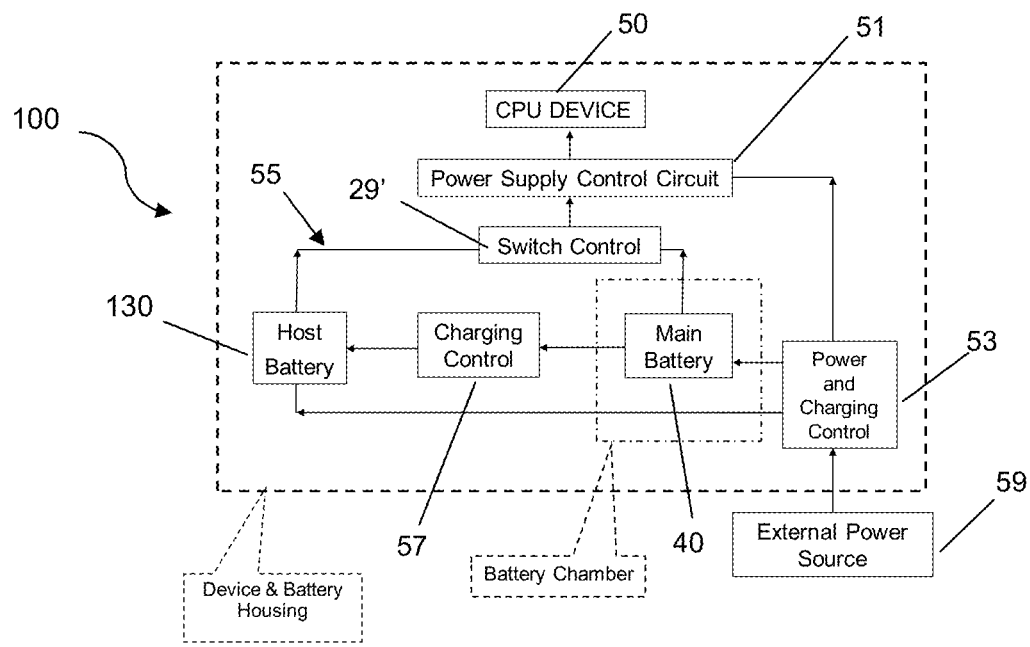
FIG. 6A is a block diagram of an electronic device including a battery device formed according to the second embodiment.
Figure 6B:
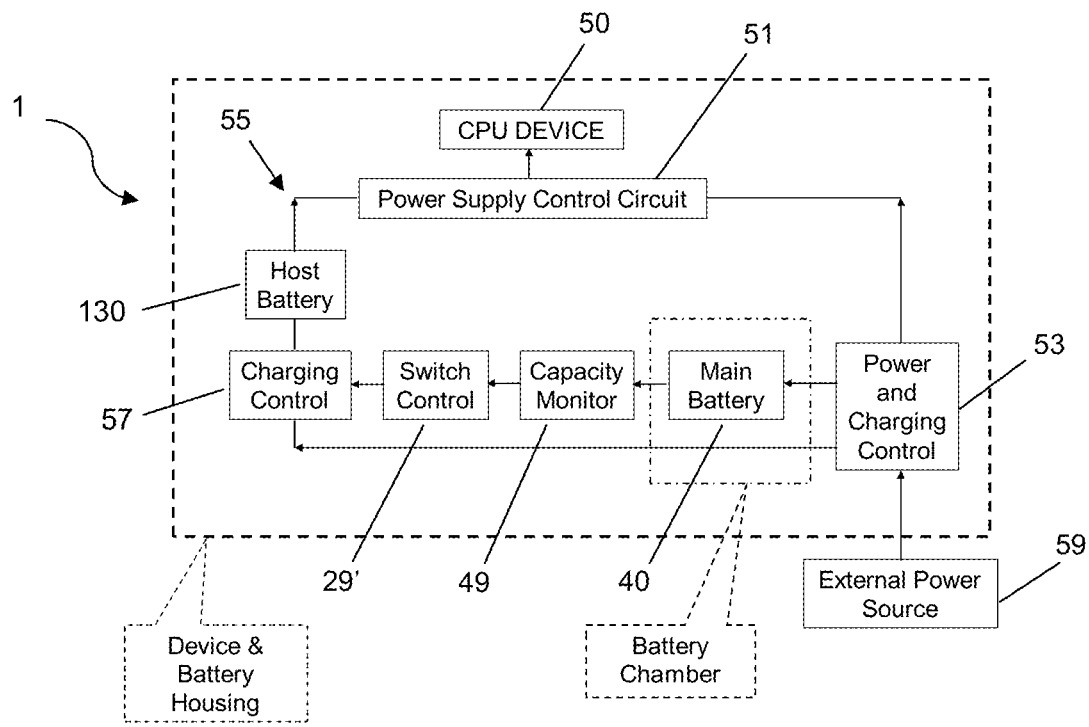
FIG. 6B is a block diagram of an electronic device including a battery device formed as a variation of the second embodiment.

FIG. 6 is a block diagram of the electronic device 100 containing the battery device 120 of the second embodiment, where the host battery 130 is built in the electronic device 100. In one example, the charging control circuit 57 can be built in the electronic device 100, along with the host battery 130 of the battery device 120. In an alternative example, the charging control circuit 57 can be included in the main battery 40 of the battery device 120. In the example shown in FIG. 6, a switch control circuit 29', instead of a battery switch 29 discussed above in the first embodiment, is provided and operates to select one of the host and main batteries 130, 40 to supply power to the electronic device 1 to carry out its normal operation. In a further example, the switch control circuit 29' can be built in the electronic device 100.

In one example, the switch control circuit 29' can operate and cause a time delay in disconnect the host battery 130 from the power supply circuit, when the main battery 40 of the battery device 120 (see FIGS. 5A and 5B) is being installed in the electronic device 1 to supply power thereto. As FIG. 6 shows, the switch control circuit 29' can electrically and selectively couple the host battery 130 and the main battery 40 to the CPU device 50 through the power supply control circuit 51. In one example, the switch control circuit 29' operates to delay the disconnection of the host battery 130, so that the host battery 130 can continue to supply power to the electronic device 1, even after the main battery 40 actuates the switch control circuit 29' to switch off the host battery 30. In another example, both the host battery 130 and the main battery 40 can operate to simultaneously supply power to the electronic device 1 before the host battery 130 is disconnected from the power supply circuit. As such, the switch control circuit 29' switches off the host battery 130 of the battery device 120, after the main battery 40 begins to supply power to the electronic device 1, thereby ensuring continuous and uninterrupted power supply to the electronic device 1 when the main battery 40 of the battery device 120 is being installed in the electronic device 1 to supply power thereto.

In an alternative example, the main battery 40 can supply power to the electronic device 1 through the host battery 130, as is described above in connection with FIG. 4B. In an example shown in FIG. 6B, the host battery 130 of the battery device 20 remains being electrically coupled to the power supply control circuit 51 and is operable to supply power to the electronic device 1. In this example, a switch control circuit 29' is employed and electrically coupled between the host battery 130 and the main battery 40. When the main battery 40 is absent from the battery device 20, the switch control circuit 29' is switched off, so that the host battery 130 operates to supply power to the electronic device 1. When the main battery 40 is in its working position in the battery device 20, the switch control circuit 29' is switched on to electrically couple the main battery 40 with the host battery 130, so that the main battery 40 can operate to supply power to the electronic device 1 through the connection between the host battery 130 and the power supply control circuit 51. A capacity monitor circuit 49 can be employed to facilitate the operation of the main battery 40.

Figures 7A, 7B:
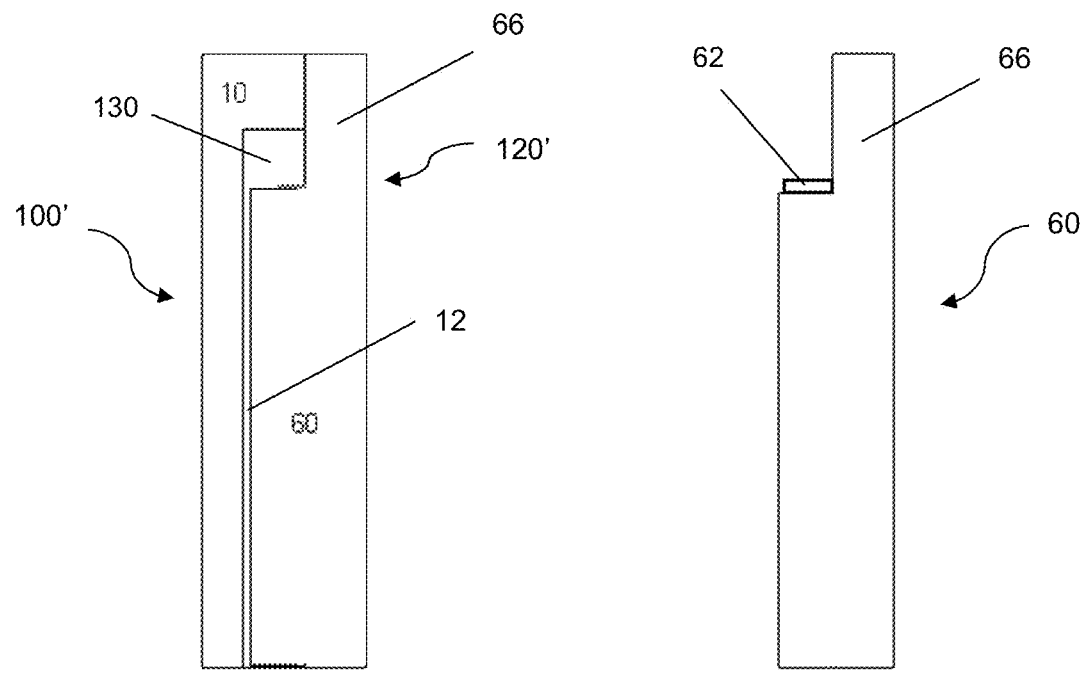
FIG. 7A is a side view of an electronic device with a variation of the battery device shown in FIG. 5A.
FIG. 7B is a side view of the variation of the main battery shown in FIG. 7A.

FIGS. 7A and 7B show a variation 120' of the battery device 120 of the second embodiment shown in FIGS. 5A and 5B. In this variation, the main battery 60 of the battery device 120' is directly placed in the battery chamber 12 formed in the main body 10 of the electronic device 100'. In such a case, a battery housing is not necessary. In one example, the battery contact 62 of the main battery 60 electrically connects with a device contact formed on the electronic device 100' for the main battery 60 to supply power to the electronic device 100'.

As is best shown in FIG. 7A, the main battery 60 of the battery device 120' is configured to extend beyond and outside the battery chamber 12 formed in the electronic device 100'. For example, the main battery 60 has an extension 66, which extends outside the battery chamber 12 and is in contact with portion of the main body 10 of the electronic device 100'. Such a main battery 60 is capable of carrying an increased capacity comparing to the main battery 40 described above in connection with the first embodiment. In one example, such main battery 60 can be formed as an extended battery of the electronic device 100'.

Figure 8A:
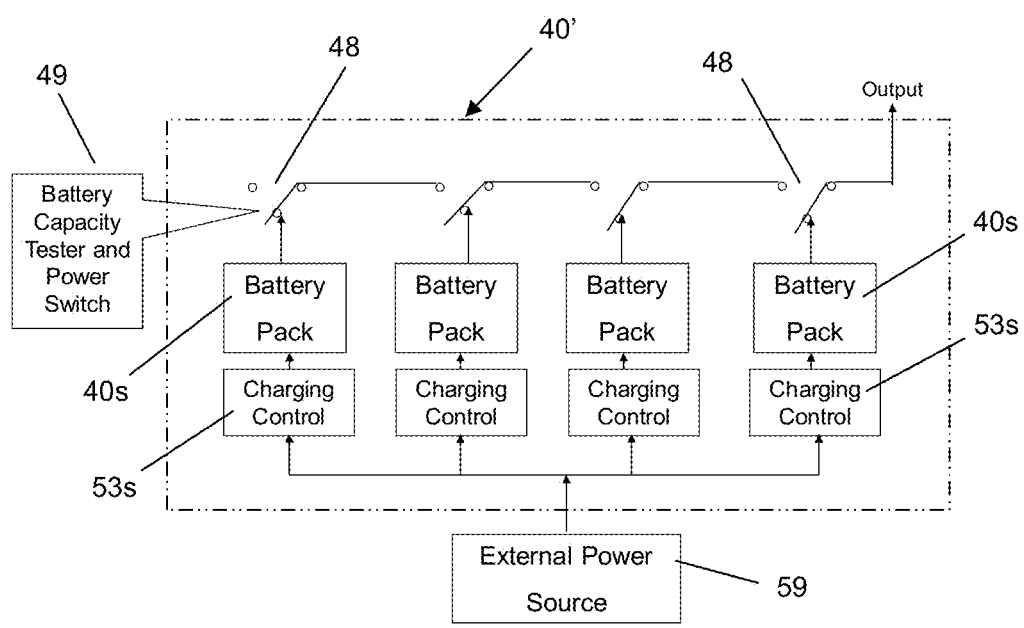
FIG. 8A is a block diagram of a variation of the main battery in the battery device.
Figure 8B:
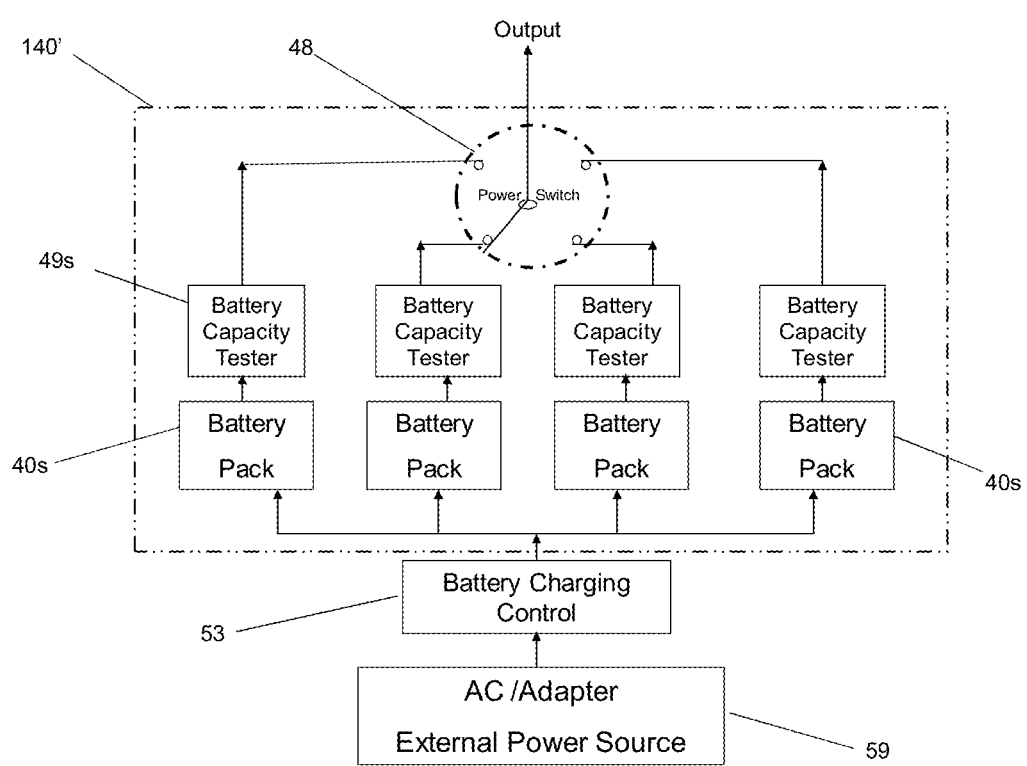
FIG. 8B is a block diagram of another variation of the main battery in the battery device.

FIGS. 8A and 8B are block diagrams of variations 40', 140' of the main battery 40 described in the above embodiments. The variations 40', 140' of the main battery 40 shown in FIGS. 8A and 8B can be used in place of the main batteries 40 in the above described embodiments. In such variations, the main battery 40' can include multiple battery segments 40s arranged in a parallel manner. A battery housing can be provided and configured to support the battery segments 40s. In one example, such multiple battery segments 40s are formed the same, so that they can be interchangeable with one another and/or with additional similarly formed spare battery segments. Each of the battery segments 40s can be selectively and electrically connected with the output end of the main battery 40'. The output end of the main battery 40' is in turn electrically connected to the battery contact 42 (see FIG. 3C) of the main battery 40', to thereby electrically connecting a selected battery segment 40s to the battery contact 42 of the main battery 40'. In one example, the multiple battery segments 40s each can be selectively and electrically connected with a connecting switch 48.

The multiple connecting switches 48 can be configured so that each of the connecting switches 48 can electronically connect with either a corresponding battery segment 40s or an adjacent connecting switch 48. As FIG. 8A shows, one of the multiple connecting switches 48 (i.e., the multiple connecting switch 48 on the right side of the drawing figure) electrically connects the corresponding battery segment 40s to the output end of the main battery 40'. Such battery segment 40s can supply power to the electronic device 1, 100, 100', when the main battery 40' is used in the electronic device 1, 100, 100' described in the above embodiments.

In addition, each of the multiple connecting switches 48 can selectively connect with a different battery segment 40s. For example, the connecting switch 48 on the right side of FIG. 8A can change to connect the second battery segment 40s from the right side of FIG. 8A to the output end of the main battery 40'. As such, other battery segments 40s can be selectively connected to the output end of the main battery 40' to supply power to the electronic device 1, 100, 100'.

The multiple connecting switches 48 can be a relay-type device. In one example, each of the multiple connecting switches 48 can operate to electrically couple with either a corresponding battery segment 40s or an adjacent connecting switch 48. The operation of the multiple connecting switches 48 is carried out based on the battery capacity either output from the corresponding battery segments 40s or detected by the battery capacity tester and power switch circuit 49. For example, if the battery capacity tester and power switch circuit 49 detects a high capacity battery segment 40s, the test circuit 49 can generate a switch-on signal to operate the corresponding connecting switch 48 to switch to and electrically contact such high capacity battery segment 40s. As such, the high capacity battery segment 40s is switched on to supply power to the electronic device 1, as is shown in FIG. 8A.

If the battery capacity tester and power switch circuit 49 detects a low capacity battery segment 40s, the test circuit 49 can generate a switch-off signal causing the corresponding connecting switch 48 to switch and contact an adjacent battery segment 40s. If such adjacent battery segment 40s has a high capacity and is electrically coupled with the corresponding connecting switch 48, the adjacent battery segment 40s is then switched on and can operate to supply power to the electronic device 1. If such adjacent battery segment 40s has a low capacity, the corresponding connecting switch 48 is switched to contact the next adjacent battery segment 40s.

The above process repeats for each of the multiple connecting switches 48, so that the battery segments 40s can take turns to be selected to supply power to the electronic device 1, until all battery segments 40s are used. At this time, the host battery 30 of the battery device 20 can be actuated to supply power to the electronic device 1. At the same time, one or more of the battery segments 40s can be removed from the battery device 40' and subjected to a battery recharging operation. Once the removed battery segments 40s are properly charged, they can be put back in the electronic device 1 to supply power thereto.

Additionally or alternatively, at least one of the multiple battery segments 40s can be removed from the electronic device 1, 100, 100', such as being subjected to a battery recharging operation. In the example shown in FIG. 8A, an electrical circuit 49 is provided for testing battery capacity and switching battery segments 40s for continuous power supply to the electronic device 1, 100, 100'. The electrical circuit 49 can operate to test the battery capacity of the battery segments 40s and identify those that are low in capacity. The electrical circuit 49 can also operate to switch to a battery segment 40s that has ample capacity for continuous power supply to the electronic device 1, 100, 100'. The battery segments 40s with low capacities can then be removed from the electronic device 1, 100, 100' and subjected to a battery recharging operation. Additional charged battery segments can be used to replace the battery segments 40s removed from the electronic device 1, 100, 100'.

According to the embodiment shown in FIG. 8A, one or more battery segments 40s of the main battery 40' can be available to supply power to the electronic device 1. If the battery segments 40s of low capacity can be timely replaced with charged battery segments, the main battery 40' can continuously and uninterruptedly supply power to the electronic device 1, 100, 100'. In such a case, the host battery 30 of the battery device 40 can be rarely used for its intended purpose and thus become unnecessary.

As FIG. 8A also shows, each of the battery segments 40s can be electrically coupled to a charging control circuit section 53s. The charging control circuit sections 53s can operate to control the battery charging operation from an external power source 59 to the respective battery segment 40s. In the example shown in FIG. 8A, multiple charging control circuit sections 53s are provided and can operate to control the battery charging operation from an external power source 59 to the respective battery segments 40s.

FIG. 8B is a block diagram of another variation 140' of the main battery 40 described in the above embodiments. In the example shown in FIG. 8B, each battery segment 40s is coupled with a separate battery capacity tester circuit 49s operable to test the battery capacity of the corresponding battery segments 40. A multiple contact switch 48 is provided to selectively and electrically connect one of the battery segments 40s to the output end of the main battery 140' to electrically connect to the electronic device 1 for supplying power thereto. For example, the multiple contact switch 48 can be switched to electrically connect with a battery segment 40s having adequate battery capacity for power supply to the CPU device 50 (see FIGS. 7A and 7B). In addition, a single charging control circuit section can be provided and electrically coupled to the multiple battery segments 40s to control the battery charging operation thereof.

The battery solution described herein allows the electronic devices (e.g., mobile devices) to continue operating and/or carrying on network communication, while the main batteries 40, 60, 40', 140' are being removed and/or replaced. Accordingly, the embodiments described herein make it possible for a hot-swap battery change operation and provide continuous and uninterrupted power supply to electronic devices 1, 100, 100', so that users can continuously operate such electronic devices 1, 100, 100' to carry out various operations without any power interruption.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A battery device for supplying power to an electronic device, the battery device comprising:
   a host battery having a first capacity;
   a main battery that is removably connected inside the electronic device and having a second capacity that is greater than the first capacity; and a battery switch operable to switch between the host battery and the main battery and electrically connect with a selected one of the host battery and the main battery to supply power to the electronic device during normal operation when the electronic device is powered on;

wherein the host battery and the main battery are each operable to independently supply power to the electronic device, so that the electronic device can carry out its normal operation;

wherein, when the main battery is placed in a working position inside the electronic device, the main battery operates the battery switch to automatically electrically connect the main battery with the electronic device to supply power to the electronic device, wherein, when the main battery is absent from the electronic device, the battery switch automatically electrically connects the host battery with the electronic device to supply power thereto, and wherein the host battery continuously supplies power to the electronic device, when the main battery is being replaced with a different battery.

2. The battery device of claim 1 further comprising a battery housing configured to attach the host battery and the main battery to the electronic device, wherein the battery housing comprises a first electrical contact for connecting to a device contact on the electronic device and a second electrical contact for connecting with a third electrical contact on the main battery; and wherein the first and second electrical contacts on the battery housing are electrically connected with each other.

3. The battery device of claim 2, wherein the host battery is enclosed in at least part of the battery housing and inseparable therefrom.

4. The battery device of claim 2, wherein the battery housing is formed with a battery cavity for accommodating and retaining the main battery in place during normal operation of the electronic device.

5. The battery device of claim 4, wherein the battery switch is formed in the battery cavity and is operable by the presence of the main battery.

6. The battery device of claim 1, further comprising a charging control circuit electrically coupled between the host battery and the main battery, wherein the main battery is operable to charge the host battery at the same time the main battery operates to supply power to the electronic device.

7. The battery device of claim 1, further comprising a switch control circuit electrically and selectively coupled the host battery and the main battery and operable to cause a time delay in disconnect the host battery from supplying power to the electronic device, after the main battery of the battery device is being installed in the electronic device to supply power thereto.

8. The battery device of claim 1, wherein the host battery has less than about 10% capacity of the main battery.

9. The battery device of claim 8, wherein the host battery has about 3-5% capacity of the main battery.

10. A battery device for supplying power to an electronic device, the battery device comprising:
a host battery;
a main battery that comprises multiple battery segments connected in parallel, at least one of which is selected to supply power to the electronic device, when the main battery is installed in the battery device;
an electrical circuit for testing battery capacity and switching battery segments, wherein the testing/switching circuit is electrically coupled to the multiple battery segments to test battery capacity of each of the battery segments; and wherein, when a low capacity is tested in a battery segment, the testing/switching circuit operates to switch to a different battery segment of the main battery; and
a battery switch operable to switch between the host battery and the main battery,
wherein the main battery operates the battery switch to automatically electrically connect with a selected one of the host battery and the main battery to supply power to the electronic device;
wherein the host battery and the main battery are each operable to independently supply power to the electronic device during normal operation of the electronic device, so that the electronic device can carry out its normal operation; and
wherein the main battery is operable to charge the host battery at the same time the main battery operates to supply power to the electronic device.

11. An electronic device comprising:
a main device body having a battery chamber;
a host battery configured to be attached to the main device body and capable of supplying power to the electronic device;
a main battery removably attached to the main device body retained in the battery chamber and capable of supplying power to the electronic device during normal operation of the electronic device, wherein the host battery and the main battery are each operable to independently supply power to the electronic device, so that the electronic device can carry out its normal operation; and
a battery switch;
wherein, when the main battery is attached to the main device body, the main battery operates the battery switch to automatically switch between the host battery and the main battery and electrically connect a selected one of the host battery and the main battery to the electronic device to supply power thereto when the main battery is removed from or attached to the main device body,
wherein, when the main battery is placed in a working position inside the electronic device, the main battery operates the battery switch to automatically electrically connect the main battery with the electronic device to supply power to the electronic device,
wherein, when the main battery is absent from the electronic device, the battery switch automatically electrically connects the host battery with the electronic device to supply power thereto, and
wherein the host battery continuously supplies power to the electronic device, when the main battery is being replaced with a different battery.

12. The electronic device of claim 11, wherein the main device body is formed with a battery chamber, and wherein the host battery is built in the main device body and outside the battery chamber.

13. The electronic device of claim 12, wherein the main battery is directly placed and retained in the battery chamber.

14. The electronic device of claim 12, wherein the battery switch is formed in the battery chamber and is operable by the presence of the main battery.

15. The electronic device of claim 11, wherein the main battery is operable to charge the host battery at the same time the main battery operates to supply power to the electronic device.

16. The electronic device of claim 11, wherein the host battery and the main battery have different capacities.

17. The electronic device of claim 11, wherein the host battery has less than about 10% capacity of the main battery.

18. The electronic device of claim 17, wherein the host battery has about 3-5% capacity of the main battery.

19. The electronic device of claim 11, wherein the battery switch is operable to disconnect the host battery from supplying power to the electronic device and to connect with the main battery to supply power to the electronic device, after the main battery is placed in a working position inside the main device body.

20. The electronic device of claim 11, wherein the battery switch is operable to electrically couple the host battery with the main battery, so that the main battery is operable to charge the host battery while the host battery is operable to supply power to the electronic device, after the main battery is placed in a working position inside the main device body.

21. The electronic device of claim 11, wherein the main battery is operable to power the electronic device and to charge the host battery at the same time, after the main battery is placed in its working position inside the main device body.

22. The battery device of claim 2, wherein the battery switch comprises first and second switch contacts formed on the battery housing and the main battery respectively, wherein, when the first and second switch contacts are separated from each other, the host battery is operable to supply power to the electronic device, and wherein, when the first and second switch contacts electrically contact with each other, the main battery is operable to supply power to at least one of the electronic device and the host battery.

23. The battery device of claim 22, wherein, when the first and second switch contacts electrically contact with each other, the main battery is operable to supply power to both the electronic device and the host battery.

24. The battery device of claim 22, wherein, when the first and second switch contacts electrically contact with each other, the battery switch is operable to disconnect the host battery from supplying power to the electronic device.

25. The battery device of claim 22, wherein, when the first and second switch contacts electrically contact with each other, the battery switch is operable to electrically couple the host battery with the main battery, so that the main battery is operable to charge the host battery while the host battery is operable to supply power to the electronic device, after the main battery is placed in a working position inside the main device body.

26. The battery device of claim 22, wherein at least one of the second and third electrical contacts is a retractable battery contact, wherein, when the first and second switch contacts are separated from each other, the retractable battery contacts are at an extended working position, and wherein, when the first and second switch contacts electrically contact with each other, the retractable battery contacts are at a retracted working position.

27. The battery device of claim 2, wherein at least one of the second and third electrical contacts is a retractable battery contact, wherein, when the retractable battery contact is at the extended working position, the host battery is operable to supply power to the electronic device, and wherein, when retractable battery contact is at a retracted working position, the main battery is operable to supply power to at least one of the electronic device and the host battery.

28. The battery device of claim 1, wherein the battery switch is operable to disconnect the host battery from supplying power to the electronic device, after the main battery is placed in its working position inside the main device body and operates to supply power to the electronic device.

29. The battery device of claim 1, wherein, after the main battery is placed in its working position inside the main device body, the battery switch is operable to electrically couple the host battery with the main battery, so that the main battery is operable to charge the host battery while the host battery is operable to supply power to the electronic device, after the main battery is placed in a working position inside the main device body.

30. The battery device of claim 1, wherein the main battery is operable to power the electronic device and to charge the host battery at the same time, after the main battery is placed in its working position inside the main device body.

* * * * *